United States Patent

[11] 3,624,117

[72] Inventors Edward J. Bartoszek
 Norristown, Pa.;
 Donald J. Mangold, New Haven, Conn.
[21] Appl. No. 135,411
[22] Filed Aug. 30, 1961
[45] Patented Nov. 30, 1971
[73] Assignee Olin Mathieson Chemical Corporation

[54] COMPOUNDS PREPARED FROM ALUMINIUM HYDRIDE-TRIALKYL AMINE AND DECABORANE
7 Claims, No Drawings
[52] U.S. Cl. ..................................... 260/448 R,
 149/19, 149/22
[51] Int. Cl. ..................................... C07f 5/06
[50] Field of Search .......................... 260/448,
 606.5, 448 R

[56] References Cited
UNITED STATES PATENTS
3,342,814 9/1967 Hogsett et al. ................. 260/448 R Primary Examiner—Leland A. Sebastian
Attorneys—Robert H. Bachman, Joseph Fleischer, Henry Prusaczyk, Paul E. Rochford, Richard S. Strickler, John D. Wilkins, Gordon D. Byrkit, Walter D. Hunter, Edward J. Mahler, Robert Alpher and George J. Koeser CLAIM: 1. Organo metallic compounds of the formula:
$[R_3N \cdot AlH_2]_2B_{10}H_{12}$,
wherein R is an alkyl group having from one to five carbon atoms.

COMPOUNDS PREPARED FROM ALUMINIUM HYDRIDE-TRIALKYL AMINE AND DECABORANE

This invention relates to organo metallic compounds and to a method for their preparation. More particularly this invention relates to organo metallic compounds of the formula:

$$[R_3N \cdot AlH_1H_2a8]_2B_{10}H_{12}$$

wherein R is an alkyl group having from 1 to 5 carbon atoms.

The novel organo metallic compounds are prepared by reacting decaborane with an aliphatic tertiary amine adduct of aluminum hydride having the formula:

$$AlH_3 \cdot R_3N$$

wherein R has the same meaning as previously described. The reaction proceeds as shown in the following equation:

$$B_{10}H_{14} + 2AlH_3R_3N \rightarrow 2H_2 + [R_3N \cdot AlH_2]_2B_{10}H_{12},$$

wherein R is an alkyl group having from 1 to 5 carbon atoms. The reaction is conveniently carried out in the presence of an inert solvent which can be a paraffin hydrocarbon such as pentane, hexane, or heptane; or a lower dialkyl ether such as diethyl ether, di-n-propyl ether, ethyl n-propyl ether, di-isopropyl ether, methyl propyl ether, methyl butyl ether, ethyl butyl ether, etc. Aromatic hydrocarbons such as benzene, toluene, or xylene may also be employed but product yields are lower.

Aliphatic tertiary amine adducts of aluminum hydride useful as starting materials include the adduct of trimethylamine, triethylamine, tri-n-propylamine, tri-isopropylamine, tri-isobutylamine, tri-isoamylamine, tri-amylamine, etc. Mixed aliphatic tertiary amine adducts of aluminum hydride including the adduct of methyldiethylamine, methyldiisopropylamine, n-butyldiamylamine, etc. are also suitable starting materials. The aluminum hydride adducts described can be conveniently prepared by methods well known in the art. These adducts can be prepared, for example, by reacting the corresponding aliphatic tertiary amine hydrochloride salt with lithium aluminum hydride in the presence of a lower dialkyl ether.

The reaction of this invention can be carried out at a temperature of from about $-20°$ C. to about $+80°$ C. with the preferred temperature being from about $0°$ C. to about $50°$ C. Depending on the temperature employed, the reaction time can be varied widely from about 0.5 to about 80 hours or more. In general the stoichiometric quantity of the aliphatic tertiary amine adduct of aluminum hydride will be reacted with decaborane although an excess of the adduct can be employed to promote completion of the reaction if desired. After the reaction has been completed, the solid organo metallic compound produced can be separated from the reaction mixture by conventional means such as by filtration or centrifugation and the solvent remaining can be removed from the product by drying under vacuum.

The organo metallic compounds produced by the process of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of the organo metallic compound and from 65 to 90 parts by weight of oxidizer, such as ammonium perchlorate, are present in the final propellant composition. In the propellant, the oxidizer and the produce of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely-divided oxidizer and finely-divided organo metallic compound can be admixed with a high solids content solution of a partially condensed urea-formaldehyde or phenol-formaldehyde resin, the proportions being such that the amount of the resin is from about 5 to 10 percent by weight, based upon the weight of the oxidizer and the organo metallic compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al. and U.S. Pat. No. 2,646,596 to Thomas et al.

The following examples illustrate various embodiments falling within the scope of this invention.

EXAMPLE I

In a dry box with a nitrogen atmosphere a solution of 8.02 grams (0.065 mole) of decaborane in 500 ml. of n-pentane which had been previously dried over sodium was placed in a 1000 ml., three-necked, round-bottom flask. A slurry of aluminum hydride-trimethylamine adduct (11.58 grams -0.130 mole) prepared by the reaction of lithium aluminum hydride with trimethylamine hydrochloride in diethyl ether and identified by infrared analysis was placed in a 500 ml. flask in the same dry-box. The flasks were then removed from the dry-box and while maintaining a nitrogen purge the 1000 ml. reaction flask was attached to the remainder of the apparatus which had been thoroughly purged with nitrogen and which consisted of a cold finger condenser cooled with a dry-ice acetone mixture to a temperature of $-78°$ C., a cold trap cooled with a dry-ice acetone bath to a temperature of $-78°$ C., a mercury bubble-off and a wet test meter. The apparatus was arranged so that gases leaving the 1000 ml. reactor passed first through the cold finger condenser then through the trap maintained at $-78°$ C. and finally through the wet test meter. The flask containing the aluminum hydride-trimethylamine slurry was attached to the reactor through two right angle glass bends with standard taper joints in such a manner that it could be rotated to admit the slurry to the reaction flask. The 1000 ml. reaction flask was also provided with a magnetic stirrer.

In small increments the trimethylamine aluminum hydride slurry was added to the decaborane solution over a 10 minute period. As the adduct was added hydrogen was evolved immediately and at the same time a white precipitate formed which gradually turned yellow as the reaction proceeded. During a period of about 8.5 hours a total of 2.943 liters (0.13 mole) of hydrogen was evolved and only a negligible amount of hydrogen was evolved during the following 8 hours. The slurry residue containing the solvent and yellow, finely divided, solid was filtered in a dry-box through a fritted glass filter and the precipitate was washed with three 100 ml. portions of dry n-pentane. The solvent-wet solid was then placed in a round bottom flask and maintained under reduced pressure for about 5 hours in order to remove the residual solvent. A total of 18.86 grams (97.9 percent of the theoretical yield) of $[(CH_3)_3N \cdot AlH_2]_2B_{10}H_{12}$, the desired product, was obtained.

The product was analyzed for aluminum, boron, nitrogen, carbon and hydrogen and the following results were obtained.

| | Al | B | N | C | H |
|---|---|---|---|---|---|
| Calculated for $Al_2B_{10}N_2C_6H_{34}$ | 18.20 | 36.49 | 9.45 | 24.30 | 11.56 |
| Found | 16.6 | 37.2 | 9.20 | 24.63 | 11.54 |
| | 16.9 | 37.7 | 9.30 | 24.37 | 11.49 |

EXAMPLES II thru V

A number of additional experiments were carried out in the same manner as described in Example I and utilizing the same apparatus with certain minor changes. In these examples the cold trap was maintained at a temperature of −196° C. by means of a liquid nitrogen bath and the adducts slurried in the particular solvent utilized were added to the decaborane solution from a calibrated addition funnel. A gas sampling bulb also was placed in the system after the trap maintained at −196° C. to permit the taking of samples of the off-gas for analysis. The experimental conditions and the results obtained in examples II−V are set forth in table I which follows.

17.94 grams (0.20 mole) of decaborane dissolved in 250 ml. of benzene was added slowly to 12.47 grams (0.10 mole) of aluminum hydride trimethylamine adduct dissolved in 150 ml. of benzene. After about 20 hours a yellow product containing $[(CH_3)_3N \cdot AlH_2]_2B_{10}H_{12}$ was obtained.

What is claimed is:

1. Organo metallic compounds of the formula:

$$[R_3N \cdot AlH_2]a2B_{10}H_{12},$$

wherein R is an alkyl group having from 1 to 5 carbon atoms.

2. $[(CH_3)_3N \cdot AlH_2B_{10}H_{12}$

3. The process of preparing organo metallic compounds of the $[R_3N \cdot AlH_2]_2B_{10}H_{12}$, wherein R is an alkyl group having from 1 to 5 carbon atoms,

TABLE I

[Reaction of $AlH_3 \cdot N(CH_3)_3$ with decaborane]

| Example | Reactants (mole) $AlH_3 \cdot N(CH_3)_3$ | $B_{10}H_{14}$ | Solvent | Hydrogen evolved (mole) | Time (hours) | Weight product (grams) | Yield (percent) | Analysis or product $([(CH_3)_3N \cdot AlH_2]_2B_{10}H_{12})$ (percent) Al | B | N | C | H |
|---|---|---|---|---|---|---|---|---|---|---|---|---|
| II | 0.0649 | 0.0325 | n-Pentane | 0.0681 | [1] 76 | 8.8 | 91.5 | 15.40 / 15.37 | 31.2 / 31.4 | 9.18 | 24.42 / 24.40 | 11.13 / 11.31 |
| III | 0.1452 | 0.0726 | do | 0.164 | [2] 67 | 19.5 | 90.6 | 15.4 / 15.0 | 35.9 / 35.6 |  | 21.78 / 21.51 | 10.26 / 10.28 |
| IV | 0.114 | 0.057 | do | 0.134 | [3] 22 | 16.2 | 95.8 | 17.0 / 17.4 | 37.4 / 37.5 | 8.75 / 8.60 | 23.31 / 23.04 | 11.15 / 11.34 |
| V | 0.1868 | 0.0934 | do | 0.1822 | 18 | 27.03 | 97.6 | 16.2 / 16.3 | 38.5 / 38.6 | 9.28 / 9.07 | 24.86 / 25.09 | 11.71 / 11.51 |

[1] 85 percent of hydrogen evolved after 6 hours, 98 percent evolved after 24 hours, product separated after 76 hours.
[2] 98 percent of hydrogen evolved after 24 hours, product separated after 67 hours.
[3] 97 percent of hydrogen evolved after 5 hours, product separated after 22 hours.

EXAMPLE VI

Utilizing a procedure similar to that of example I a total of 11.90 grams (0.097 mole) of decaborane dissolved in 175 ml. diethyl ether was reacted slowly with 17.76 grams (0.195 mole) of aluminum hydride trimethylamine adduct in 400 ml. of diethyl ether. After about 30 hours a high yield of product was obtained which by infrared analysis was shown to correspond closely to the product of example I.

EXAMPLE VII

In this example in which benzene was employed as the solvent a procedure similar to example I was followed. A total of which comprises reacting decaborane with an adduct of the formula:

$$R_3N \cdot AlH_3,$$

wherein R is an alkyl group having from 1 to 5 carbon atoms, in the presence of an inert solvent.

4. The process of claim 3 wherein the reaction is carried out at a temperature of from about −20° C. to about +80° C.

5. The process of claim 4 wherein the adduct is $(CH_3)_3N \cdot AlH_3$.

6. The process of claim 4 wherein the inert solvent is n-pentane.

7. The process of claim 4 wherein the adduct is $(CH_3)_3N \cdot AlH_3$ and the inert solvent is n-pentane.

* * * * *

PO-1050
(5/69)

UNITED STATES PATENT OFFICE
CERTIFICATE OF CORRECTION

Patent No. 3,624,117            Dated November 30, 1971

Inventor(s) Edward J. Bartoszek and Donald J. Mangold

It is certified that error appears in the above-identified patent and that said Letters Patent are hereby corrected as shown below:

Column 1, line 6, the formula $[R_3N \cdot AlH_1H_2a8]_2 B_{10}H_{12}$    should read    $[R_3N \cdot AlH_2]_2 B_{10}H_{12}$ .

Column 3, line 13, "table" should read --Table--.
Column 3, lines 13, 33, 39 and 42 "example" should read --Example--.
Column 4, in claim 1, the formula $[R_3N \cdot AlH_2]a2B_{10}H_{10}$    should read    $[R_3N \cdot AlH_2]_2 B_{10}H_{12}$ .

Column 4, in claim 2, the formula $[(CH_3)_3N \cdot AlH_2B_{10}H_{12}$    should read    $[(CH_3)_3N \cdot AlH_2]_2 B_{10}H_{12}$ .

Column 4, in claim 3, before the formula insert --formula--.

Signed and sealed this 20th day of June 1972.

(SEAL)
Attest:

EDWARD M. FLETCHER, JR.            ROBERT GOTTSCHALK
Attesting Officer                     Commissioner of Patents